(No Model.)
E. SOLVAY.
PROCESS OF AND APPARATUS FOR MAKING SODIUM BICARBONATE.
No. 364,552. Patented June 7, 1887.
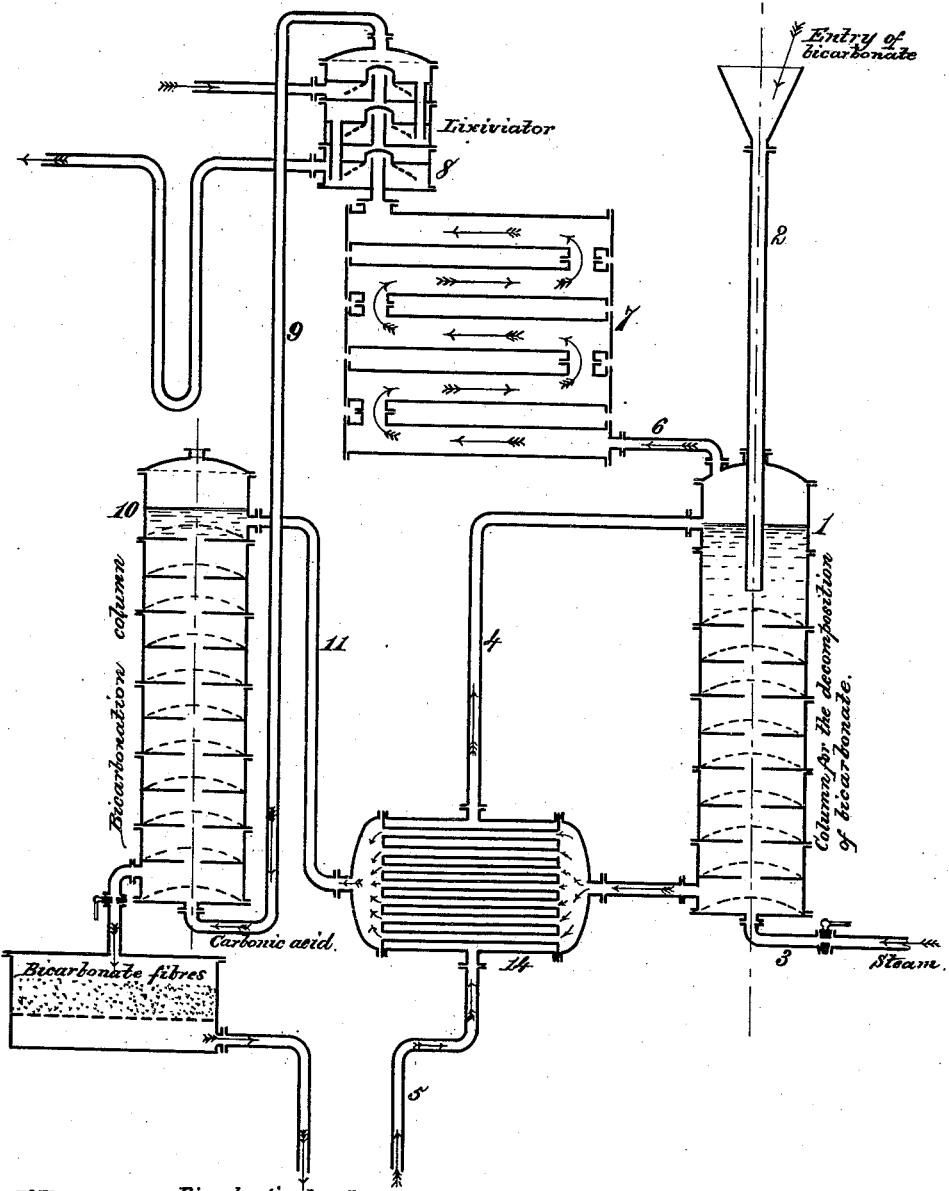

UNITED STATES PATENT OFFICE.

ERNEST SOLVAY, OF BRUSSELS, BELGIUM.

PROCESS OF AND APPARATUS FOR MAKING SODIUM BICARBONATE.

SPECIFICATION forming part of Letters Patent No. 364,552, dated June 7, 1887.

Application filed August 9, 1886. Serial No. 210,488. (No model.)

*To all whom it may concern:*

Be it known that I, ERNEST SOLVAY, a Belgian subject, residing at Brussels, in the Kingdom of Belgium, have invented an Improved Process and Apparatus for the Manufacture of Pure Bicarbonate of Soda in the Manufacture of Ammonia Soda, of which the following is a specification.

Bicarbonate of soda produced in the manufacture of ammonia soda is not pure, for the reason that it contains ammonia which can only be removed with difficulty, and frequently it also contains odoriferous empyreumatic matters which render it unfit for use.

The object of the present invention is to provide a simple and effective process whereby I am enabled to obtain commercially-pure bicarbonate of soda.

In the annexed drawing I have shown an apparatus for carrying out my process.

The bicarbonate of soda resulting from the treatment of a solution of salt and ammonia with carbonic acid is treated as follows: The crude bicarbonate of soda is dissolved in a column or chamber containing water, and to which steam is admitted or heat applied for the purpose of decomposing the bicarbonate. After such treatment with heat the solution is decanted or filtered, and is admitted into another chamber or column, in which it is caused to descend, and wherein it encounters an ascending current of carbonic-acid gas. After having been subjected to the action of such gas the bicarbonate of soda is separated from the liquid, and is then found to be in a pure state, ready for commercial use and free from ammonia and other deleterious matters.

The apparatus shown in the drawing is best adapted for carrying out my process, and is, with slight modifications, the same as the ordinary apparatus used in the manufacture of ammonia soda, described in Letters Patent granted to me March 4, 1873, No. 136,463. It is to be understood, however, that any other appropriate form of apparatus may be resorted to in carrying out my process.

In the drawing, the reference-numeral 1 designates a column or vertical chamber which is provided with horizontal perforated plates, and has at its top an inlet-tube and funnel, 2, for the admission of the crude bicarbonate of soda to be treated or purified. At the base of the column is a pipe, 3, for the admission of steam, and another pipe, 4, leads into the top of the column and serves as an inlet for water. This pipe 4 communicates with a cooling drum or chamber, 14, traversed by a number of pipes, and a pipe, 5, serves to admit water into said drum, for the object hereinafter stated. A suitable pump serves to force the water through the pipe 5, cooling-drum 14, and pipe 4 into the column 1. The crude bicarbonate of soda is decomposed in the column 1 by the action of the steam; or it may be by a source of heat otherwise applied, and the carbonic acid resulting from such decomposition passes out through a pipe, 6, and enters a suitable cooler, 7, from whence it is admitted into a lixiviator, 8, where it is purified. A pipe, 9, extending from such lixiviator communicates with the base of a column or vertical chamber, 10, in which bicarbonation is effected, as in my patent above referred to. This chamber or column 10 also communicates, by a pipe, 11, leading into its top, with the cooling-drum 14. It will be perceived that the liquid or solution discharged from the column 1 is caused to pass through the tubes in the cooler 14, and that it can be cooled by the water flowing around such tubes and entering the column 1, in order to dissolve the crude bicarbonate of soda fed into the same. The bicarbonate of soda produced in the above-described apparatus as a result of the process specified is pure, and need only be dried and treated in the usual manner in order to be ready for use.

What I claim is—

1. The process herein described for obtaining pure bicarbonate of soda from the crude bicarbonate, said process consisting in decomposing the crude bicarbonate by heat, cooling and lixiviating the carbonic-acid gas evolved, and decanting and cooling the soda solution resulting, and finally treating said solution with said purified gas and filtering and drying the resulting bicarbonate; substantially as described.

2. An apparatus for manufacturing pure bicarbonate of soda, consisting, essentially, of the columns or chambers 1 and 10, pipes 3 and 6, for admitting steam and discharging carbonic acid from the column 1, the inlet-pipe 2, for impure bicarbonate of soda, water-inlet pipe 4, cooling-drum 14, water-inlet pipe 5, cooler 7, lixiviator 8, pipe 9, and pipe 11, substantially as described.

In testimony whereof I have hereunto signed my name in the presence of two subscribing witnesses.

ERNEST SOLVAY.

Witnesses:
R. S. KIRKPATRICK,
H. V. E. KIRKPATRICK.